United States Patent
Needham et al.

(10) Patent No.: US 6,801,783 B2
(45) Date of Patent: Oct. 5, 2004

(54) BASE SITE AND METHOD FOR QUICKLY ESTABLISHING A CDMA DISPATCH CALL

(75) Inventors: Michael L. Needham, Palatine, IL (US); Richard J. Vilmur, Palatine, IL (US); Leigh M. Chinitz, Wellesley, MA (US)

(73) Assignee: Motorola, Inc., Schaumburg, IL (US)

( * ) Notice: Subject to any disclaimer, the term of this patent is extended or adjusted under 35 U.S.C. 154(b) by 218 days.

(21) Appl. No.: 10/027,365

(22) Filed: Dec. 20, 2001

(65) Prior Publication Data

US 2003/0119539 A1 Jun. 26, 2003

(51) Int. Cl.⁷ ............................................... H04Q 7/38
(52) U.S. Cl. ........................... 455/519; 455/452.1
(58) Field of Search ............................... 455/518, 519, 455/520, 521, 522, 515, 452.1

(56) References Cited

U.S. PATENT DOCUMENTS

| | | | |
|---|---|---|---|
| 5,056,109 A | 10/1991 | Gilhousen et al. | |
| 5,216,692 A | 6/1993 | Ling | |
| 5,257,183 A | 10/1993 | Tam | |
| 5,265,119 A | 11/1993 | Gilhousen et al. | |
| 5,267,262 A | 11/1993 | Wheatley, III | |
| 5,323,452 A | 6/1994 | Dickman et al. | |
| 5,383,219 A | 1/1995 | Wheatley, III et al. | |
| 5,465,391 A * | 11/1995 | Toyryla ..................... | 455/518 |
| 5,485,486 A | 1/1996 | Gilhousen et al. | |
| 5,548,808 A | 8/1996 | Bruckert et al. | |
| 5,590,177 A | 12/1996 | Vilmur et al. | |
| 5,613,209 A | 3/1997 | Peterson et al. | |
| 5,621,723 A | 4/1997 | Walton, Jr. et al. | |
| 5,691,979 A | 11/1997 | Cadd et al. | |
| 5,711,011 A | 1/1998 | Urs et al. | |
| 5,797,097 A | 8/1998 | Roach, Jr. et al. | |
| 5,852,781 A | 12/1998 | Ahvenainen | |
| 5,878,038 A | 3/1999 | Willey | |
| 5,881,058 A | 3/1999 | Chen | |
| 5,881,368 A | 3/1999 | Grob et al. | |
| 5,887,252 A | 3/1999 | Noneman | |
| 5,914,958 A | 6/1999 | Chinitz et al. | |
| 5,920,549 A | 7/1999 | Bruckert et al. | |
| 5,960,356 A | 9/1999 | Alperovich et al. | |
| 5,987,012 A | 11/1999 | Bruckert et al. | |
| 6,005,848 A | 12/1999 | Grube et al. | |
| 6,075,994 A * | 6/2000 | Bhat ......................... | 455/458 |
| 6,108,518 A * | 8/2000 | Madour et al. ............ | 340/7.25 |
| 6,115,388 A | 9/2000 | Chinitz et al. | |
| 6,169,906 B1 | 1/2001 | Bruckert | |
| 6,178,166 B1 | 1/2001 | Wilson et al. | |
| 6,181,685 B1 | 1/2001 | Chinitz et al. | |
| 6,188,767 B1 | 2/2001 | Needham et al. | |
| 6,233,461 B1 | 5/2001 | Chinitz et al. | |
| 6,331,971 B1 * | 12/2001 | Raith ........................ | 370/311 |
| 6,333,921 B1 | 12/2001 | Grube et al. | |
| 6,377,560 B1 * | 4/2002 | Dailey ....................... | 370/329 |
| 6,584,086 B1 * | 6/2003 | Shim et al. ................ | 370/335 |

FOREIGN PATENT DOCUMENTS

EP     0 828 355 A2     3/1998

\* cited by examiner

*Primary Examiner*—Nick Corsaro
(74) *Attorney, Agent, or Firm*—Jeffrey K. Jacobs

(57) ABSTRACT

To address the need for a base site and method for quickly establishing a CDMA dispatch call, the present invention provides for signaling mobile stations (e.g., 120–123) to inform them of the call and then starting the dispatch call without waiting for the call participants to request their inbound links. The dispatch call is first transmitted by base sites (e.g., 110–112) of all the service coverage areas (e.g., 101–103) that may have call participants, and then discontinued at those base sites where no inbound link requests are received within a period of time. Thus, the dispatch call is established while "call setup" effectively continues.

15 Claims, 2 Drawing Sheets

BASE SITE AND METHOD FOR QUICKLY ESTABLISHING A CDMA DISPATCH CALL

CROSS-REFERENCE TO RELATED APPLICATION

This application is related to the following co-pending applications all filed on even date herewith, all assigned to the assignee of the present application, and all hereby incorporated by reference into the present application: "METHOD AND APPARATUS FOR MOBILE-INITIATED, CDMA-DISPATCH SOFT HANDOFF," "METHOD AND APPARATUS FOR BASE-INITIATED, CDMA-DISPATCH SOFT HANDOFF," "METHOD AND APPARATUS FOR CDMA-DISPATCH SOFT HANDOFF," and "METHOD AND APPARATUS FOR QUICKLY ESTABLISHING A CDMA DISPATCH CALL."

FIELD OF THE INVENTION

The present invention relates generally to the field of wireless communications, and more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites has a substantially distinct coverage area and are geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

The communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in each site to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talkgroup members are typically in a listen only mode (i.e., not able to transmit when another member is talking) and thus are not allocated a dedicated reverse link. In a TDMA system, for example, time slots are allocated to different users. A talkgroup member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as CDMA, has achieved much higher bandwidth efficiency for a given wireless spectrum allocation, and hence has proved to be an excellent alternative for serving large populations of multiple access users, than analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a conventional dispatch system. Current CDMA systems employ a form of forward power control. This means that, in a typical one-to-one (cellular) conversation, the communication unit periodically informs the base station how well it is receiving the outbound signal. If possible, the base station reduces its outbound power. If necessary, the base station increases its outbound power. This communication between the base station and the communication unit requires a two-way communication link between the two. In a dispatch situation, the most intuitive outbound power control scheme is for the base station to respond to requests to increase the power coming from any unit that requires it. However, this can only occur if all units involved in the dispatch call have an established two-way communication link.

CDMA systems also use soft handoff at cell (site) boundaries which, in a dispatch setting, would require each of the listening units to signal the base station when another cell is found to have sufficient (usually greater) signal strength to handle the call as the communication unit migrates away from the base station, and closer to another base station. In turn, the base station will enable the now closer base station to both send and receive the same traffic to and from the migrating communication unit. In order for this procedure to take place, the communication unit must have a communication path in to the fixed end.

Reverse power control is another important aspect of CDMA systems. (In fact, this is much more important than forward power control.) Reverse power control attempts to equalize the received signal powers for all communication units controlled by a particular base station. By having the base station monitoring (and accordingly vary) power from listening communication units, the efficiency of CDMA is realized.

In order to avoid excessive interference on the reverse link, communication units accessing the channel for the first time (i.e., before reverse power control has been established) use what is known as "access probes". This means that they access the channel with low power, and slowly ramp up their power until a response from the fixed end tells them that their signal has been received. For cellular communications, the time delay caused by this access method is insignificant. On the other hand, the time delay in setting up a link for a follow-up call during a dispatch group call would be significant and must necessarily have been established in advance. In dispatch, any one of the talkgroup members may want to send an inbound message and then drop back to listening status. If each access required access probes, the delay would be intolerable for a quality dispatch service. One solution is the establishment of multiple reverse (inbound) signaling links for CDMA systems. However, these links must be established in a manner that meets the strict timing requirements of dispatch service, so as not to delay the initial call setup.

In today's dispatch systems, the location of talk group members is tracked. That is, as communication units move from one base site to another, the serving base site of each unit is known by the system. Thus, the system knows at the outset of a dispatch group call which base sites must set up the wireless links required for the call. CDMA systems, however, use location paging. Instead of continuously tracking individual units, pages are broadcast to units during call-setup to determine which base site must support the call. Mobile units monitor a paging channel, and when paged, reply with a page response indicating their serving base site. While this works well for cellular calls where only one unit needs to be located and sufficient time is allowed during call-setup for the page and page response, it does not work well for locating multiple units within the tight call-setup time allowed for dispatch calls. This is particularly true because when multiple units are located in a single cell, their responses can collide. Thus, to support dispatch services comparable to those of existing dispatch systems, CDMA base sites must establish all the required wireless links, at the required base sites, within the strict dispatch call-setup time.

Therefore, a base site and method for quickly establishing a CDMA dispatch call is needed.

DESCRIPTION OF A PREFERRED EMBODIMENTS

To address the need for a base site and method for quickly establishing a CDMA dispatch call, the present invention provides for signaling mobile stations to inform them of the call and then starting the dispatch call without waiting for the call participants to request their inbound links. The dispatch call is first transmitted by base sites of all the service coverage areas that may have call participants, and then discontinued at those base sites where no inbound link requests are received within a period of time. Thus, the dispatch call is established while "call setup" effectively continues.

Figure 1:
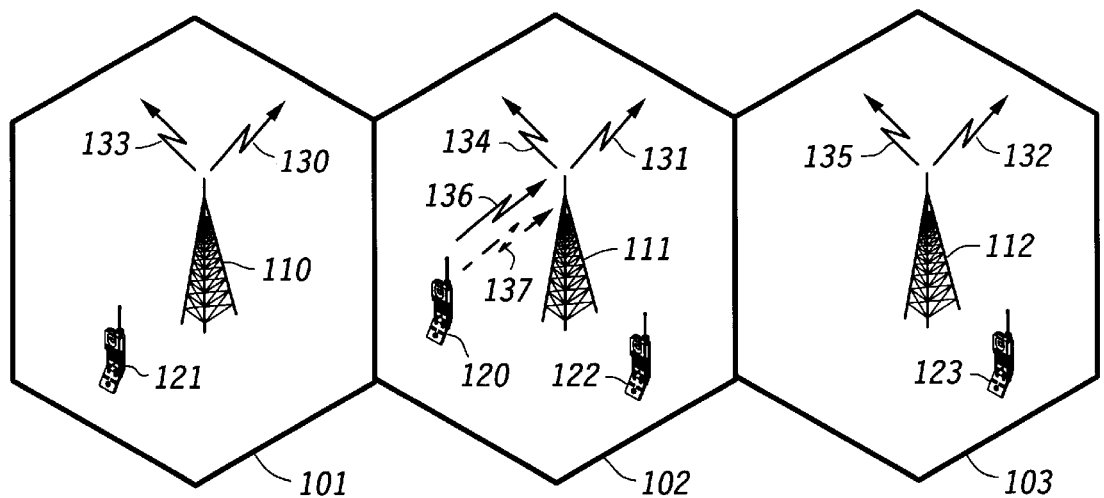
FIG. 1 is a block diagram depiction of a communication system in accordance with a preferred embodiment of the present invention.
Figure 2:
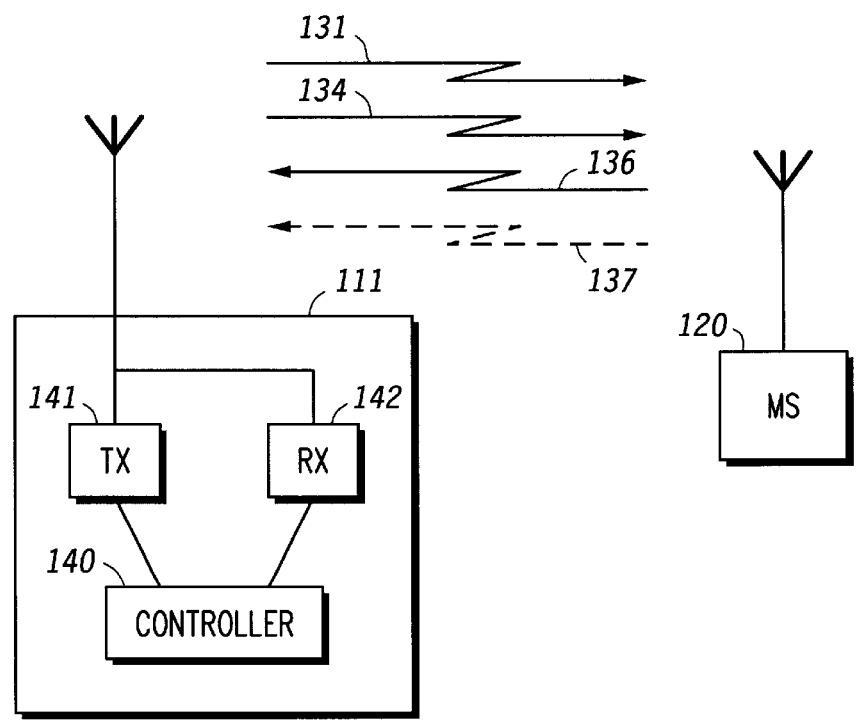
FIG. 2 is a block diagram depiction of a base site from the communication system of FIG. 1 in accordance with a preferred embodiment of the present invention.
Figure 3:
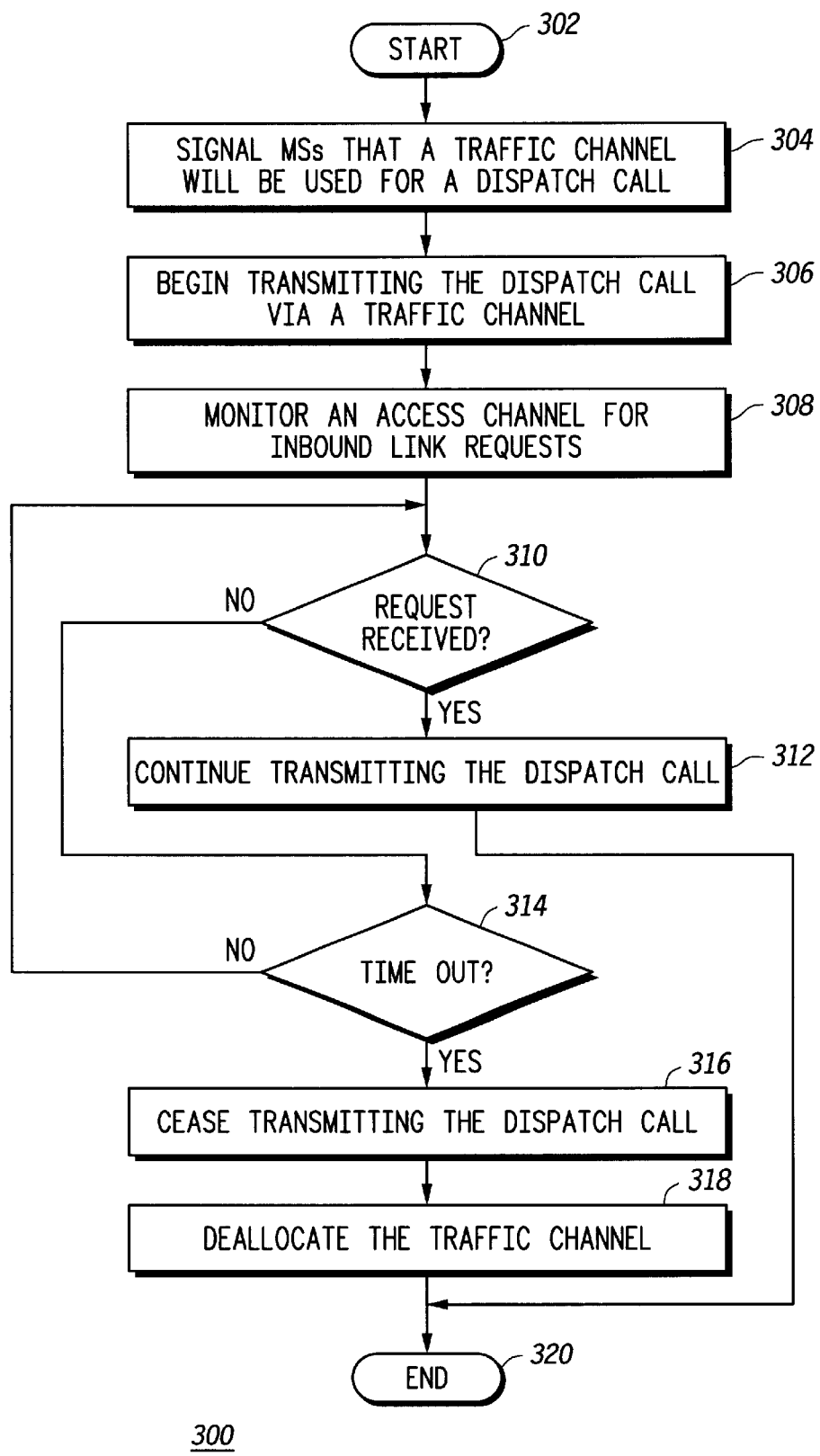
FIG. 3 is a logic flow diagram of steps executed by a base site in accordance with a preferred embodiment of the present invention.

The present invention can be more fully understood with reference to FIGS. 1–3, wherein like numerals designate like components. FIG. 1 is a block diagram depiction of communication system 100 in accordance with a preferred embodiment of the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art. System 100 comprises a plurality of communication units 12014 123 that are each members of different talkgroups. (Note that the terms-of-art, "communication unit," "mobile station," and "mobile unit" are used interchangeably throughout this description.) In the preferred embodiment, each of the communication units 120–123 is physically capable of duplex communications, although during typical group communications, only a single communication unit is transmitting at a time. Further, each of the communication units 120–123 comprises a common set of elements that include a transmitter, receiver, and a processor.

The fixed infrastructure comprises those elements normally required to support communications within wireless system 100 and, in the preferred embodiment, conforms to a typical CDMA architecture. In particular, the wireless CDMA communication infrastructure comprises well-known components such as base sites 110–112 and their respective service coverage areas 101–103. In practice, the base sites 110–112 typically communicate with one or more base site controllers, a switch, and additional well-known infrastructure equipment not shown. To illustrate the present invention simply and concisely, the communication infrastructure has been limited to that shown in FIG. 1.

FIG. 2 is a block diagram depiction of base site 111 in accordance with a preferred embodiment of the present invention. Base site 111 comprises transmitter 141, receiver 142, and controller 140. Base sites in general and base site transmitters, receivers, and controllers in particular are well known in the art. Controller 140 preferably comprises one or more memory devices and processing devices such as a microprocessor and a computer memory. In the preferred embodiment, under the control of software/firmware algorithms stored in the memory devices of base site 111, base site 111 performs those tasks required for well-known base site operation and, additionally, the method described relative to FIG. 3.

CDMA communication channels 130–137 are effectively provided through the use of codes using well-known techniques, e.g., through a combination of orthogonal Walsh codes and pseudorandom noise (PN) sequences. In the preferred embodiment, channels 130–132 comprise outbound control channels and channels 133–135 comprise full-rate outbound traffic channels transmitted by base sites 110–112, respectively. Preferably, channel 136 is an inbound access channel on which mobile stations (MSs) may signal base site 111. Lastly, channel 137 is a low-rate inbound link used by an MS to communicate forward power control information, soft handoff information, and/or reverse power information. The use of this link is described at length in U.S. Pat. No. 5,914,958, entitled "FAST CALL SETUP IN A CDMA DISPATCH SYSTEM," and U.S. Pat. No. 6,115,388, entitled "ESTABLISHMENT OF MULTIPLE LOW-RATE INBOUND SIGNALING LINKS IN CDMA DISPATCH SYSTEM," both of which are hereby incorporated by reference.

Operation of a preferred communication system 100 occurs substantially as follows. When a dispatch call is initiated outbound traffic channels 133–135 are allocated by base sites 110–112, respectively. Also base sites 110–112 use control channels 130–132 to signal MSs that channels 133–135 are to be used for the dispatch call, all respectively. Upon receiving the dispatch call signal, either via the infrastructure network or from the originating MS, base sites 110–112 transmit the dispatch call via traffic channels 133–135, respectively. Therefore, MSs 120–123, would each preferably receive control signaling from their serving base site that directs each of them to the serving site traffic channel on which the dispatch call would be transmitted.

Thus, the MSs addressed by a dispatch call can begin receiving the dispatch call without signaling the base site beforehand.

However, because the infrastructure does not know the location of all the MSs addressed by the dispatch call before starting the call, it allocates a traffic channel and transmits the call at every base site that may serve such an MS. It is likely, though, that one or more base sites that allocate a channel actually do not serve any MSs targeted by the call. To address this problem, base sites 110–112 monitor for requests by targeted MSs to establish inbound links and then cease transmitting and deallocate the traffic channel if no requests are received within a period of time.

For example, in the case of base site 111 where MSs 120 and 122 are not members of the talkgroup targeted by the dispatch call being transmitted on traffic channel 134, neither MS 120 nor MS 122 will request an inbound link. Receiver 142 monitors access channel 136 for requests, and when none are received within a period of time, controller 140 deallocates the traffic channel and instructs transmitter 141 to cease transmitting the dispatch call via the traffic channel.

In the preferred embodiment, the period of time that a base site will wait for requests before deallocating the traffic channel is predetermined. The period is preferably based on the theoretical worst case scenario for at least one MS to successfully request an inbound link. This worst case scenario may need to take into account collisions that could occur when multiple MSs located in the same service coverage area request an inbound link simultaneously. Alternatively, the period of time might be adjusted dynamically based on a history of actual MS request times that the infrastructure records.

Now consider that another dispatch call is initiated and MS 120 is a member of the talkgroup targeted. MS 120 would now receive the control signaling announcing the call and begin receiving the call via traffic channel 134. After joining the call in progress, MS 120 transmits a request to base site 111 via access channel 136 to establish an inbound link with base site 111. Receiver 142, monitoring access channel 136 for requests, receives the request from MS 120. Thus, having received at least one request, base site 111 continues transmitting the dispatch call for MS 120 to continue receiving.

In the manner described above, the present invention allows CDMA dispatch calls to be established quickly, as compared to cellular calls, by providing for inbound link requests in the background of call setup. Base sites that do not receive any requests shortly after beginning the call are "pruned" from the call to free the channels that are not needed. Therefore, the present invention provides a relatively simple solution for locating multiple communication units during call setup without delaying the start of the dispatch call. Because of the great importance of call setup time to the perceived quality of dispatch service, the present invention provides a solution with tradeoffs that are consistent with the priorities of dispatch.

FIG. 3 is a logic flow diagram of steps executed by a base site in accordance with a preferred embodiment of the present invention. Logic flow 300 begins (302) when the base site signals (304) MSs via a control channel that an outbound traffic channel has been allocated for a dispatch call. Upon receiving the dispatch call source signal, the base site begins (306) transmitting the dispatch call via the traffic channel. The base site also begins monitoring (308) the common access channel on which any inbound link requests will be transmitted. Although transmitting the dispatch call is shown to logically occur before monitoring for link requests, a base site may be continually receiving and decoding signals on the access channel, any one of which may be a link request for this dispatch call. Thus, in reality the base site begins transmitting the dispatch call as soon as it can, without regard to link requests, (although often depending on events in other parts of the infrastructure) and may be beginning transmission while at the same time monitoring the access channel for link requests.

If (310) a request is received, then the base site simply continues (312) transmitting the dispatch call and the logic flow ends. Instead, if (314) no link request is received within a timeout period then the base site ceases (316) to transmit the dispatch call and deallocates (318) the traffic channel to free it for other services. Thus, logic flow 300 ends (320).

While the present invention has been particularly shown and described with reference to particular embodiments thereof, it will be understood by those skilled in the art that various changes in form and details may be made therein without departing from the spirit and scope of the present invention.

What is claimed is:

1. A method for a base site to quickly establish signaling links required for a CDMA dispatch call comprising the steps of:

establishing an outbound link for the dispatch call;

beginning to transmit the dispatch call via the outbound link;

when no requests to establish an inbound link are received within a period of time subsequent to establishing the outbound link, ceasing to transmit the dispatch call via the outbound link; and deallocating the outbound link.

2. The method of claim 1 wherein the outbound link comprises a full-rate CDMA outbound traffic channel and the inbound link comprises a low-rate inbound link.

3. The method of claim 2 wherein the low-rate inbound link is used to communicate at least one of forward power control information, soft handoff information, and reverse power information.

4. The method of claim 1 wherein the requests to establish an inbound link comprise requests from mobile units that are group members of a talkgroup included in the dispatch call.

5. The method of claim 1 further comprising the step of continuing to transmit the dispatch call via the outbound link when at least one request to establish an inbound link is received within the period of time subsequent to establishing the outbound link.

6. The method of claim 1 further comprising the step of signaling on a control channel to indicate the initiation of the dispatch call via the outbound link.

7. The method of claim 1 wherein the period of time is equivalent to an amount of time for a base site to receive a request to establish an inbound link, subsequent to establishing an outbound link, in a worst-case scenario.

8. The method of claim 7 wherein the period of time is predetermined.

9. The method of claim 1 wherein the period of time is determined by the base site based on a history of time taken to receive requests to establish inbound links subsequent to establishing outbound links.

10. A base site comprising:

a transmitter;

a receiver adapted to receive requests to establish an inbound link; and a controller, coupled to the transmitter and receiver, adapted to instruct the transmitter to establish an outbound link for a CDMA dispatch call, adapted to begin transmitting the dispatch call via the outbound link, adapted to monitor, via the receiver, an inbound common access channel for requests to establish an inbound link, and further adapted to deallocate the outbound link and to instruct the transmitter to cease transmitting the dispatch call via the outbound link when no requests to establish an inbound link are received by the receiver within a period of time subsequent to establishing the outbound link.

11. The base site of claim 10 wherein the outbound link comprises a full-rate CDMA outbound traffic channel and the inbound link comprises a low-rate inbound link.

12. The base site of claim 11 wherein the low-rate inbound link is used to communicate at least one of forward power control information, soft handoff information, and reverse power information.

13. The base site of claim 10 wherein the requests to establish an inbound link comprise requests from mobile units that are group members of a talkgroup included in the dispatch call.

14. The base site of claim 10 wherein the transmitter is further adapted to continue to transmit the dispatch call via the outbound link when the receiver receives at least one request to establish an inbound link within the period of time subsequent to establishing the outbound link.

15. The base site of claim 10 wherein the controller is further adapted to instruct the transmitter to transmit signaling on a control channel to indicate the initiation of the dispatch call via the outbound link.

* * * * *

UNITED STATES PATENT AND TRADEMARK OFFICE
CERTIFICATE OF CORRECTION

PATENT NO. : 6,801,783 B2
DATED : October 5, 2004
INVENTOR(S) : Needham et al.

It is certified that error appears in the above-identified patent and that said Letters Patent is hereby corrected as shown below:

Column 6,
Line 29, after "link;" insert -- monitoring an inbound common access channel for requests to establish an inbound link; --

Signed and Sealed this

Twenty-eighth Day of December, 2004

JON W. DUDAS
*Director of the United States Patent and Trademark Office*